United States Patent
Higa et al.

(10) Patent No.: US 12,181,851 B2
(45) Date of Patent: Dec. 31, 2024

(54) SETTINGS INFORMATION GENERATION DEVICE, SETTINGS INFORMATION GENERATION METHOD, AND RECORDING MEDIUM

(71) Applicant: OMRON Corporation, Kyoto (JP)

(72) Inventors: Yoshinori Higa, Takatsuki (JP); Makoto Okuno, Kusatsu (JP); Shinji Murayama, Otsu (JP)

(73) Assignee: OMRON Corporation, Kyoto (JP)

( * ) Notice: Subject to any disclaimer, the term of this patent is extended or adjusted under 35 U.S.C. 154(b) by 404 days.

(21) Appl. No.: 17/432,944

(22) PCT Filed: Feb. 13, 2020

(86) PCT No.: PCT/JP2020/005620
§ 371 (c)(1),
(2) Date: Aug. 23, 2021

(87) PCT Pub. No.: WO2020/184056
PCT Pub. Date: Sep. 17, 2020

(65) Prior Publication Data
US 2022/0155745 A1    May 19, 2022

(30) Foreign Application Priority Data

Mar. 14, 2019 (JP) .................. 2019-047220

(51) Int. Cl.
*G05B 19/05* (2006.01)
*G05B 19/042* (2006.01)

(52) U.S. Cl.
CPC ....... *G05B 19/052* (2013.01); *G05B 19/0421* (2013.01); *G05B 19/0423* (2013.01);
(Continued)

(58) Field of Classification Search
CPC .............. G05B 19/052; G05B 19/0421; G05B 19/0423; G05B 19/054; G05B 2219/1215;
(Continued)

(56) References Cited

U.S. PATENT DOCUMENTS 6,446,202 B1 *  9/2002  Krivoshein ......... H04L 41/0853
                                                        713/1
6,449,715 B1 *  9/2002  Krivoshein ........ G05B 19/4185
                                                        713/1
(Continued)

FOREIGN PATENT DOCUMENTS

| CN | 107193252 | 9/2017 |
| CN | 108572628 | 9/2018 |

(Continued)

OTHER PUBLICATIONS

"Office Action of Japan Counterpart Application" with English translation thereof, issued on Nov. 8, 2022, p. 1-p. 5.
(Continued)

*Primary Examiner* — Charles R Kasenge
(74) *Attorney, Agent, or Firm* — JCIPRNET

(57) ABSTRACT

A settings information generation device, for reducing the number of settings steps pertaining to a device in a superordinate device that communicates with a slave device to which the device is connected, includes: a selection unit for accepting a selection of a device to be connected; an acquisition unit for acquiring operational settings information including the input/output data length of the selected device; and a generation unit for generating, on the basis of the operational settings information, superordinate device settings information for setting a storage region for storing data exchanged with the device by a controller via a device management unit.

10 Claims, 5 Drawing Sheets

(52) U.S. Cl.
CPC .... *G05B 19/054* (2013.01); *G05B 2219/1215* (2013.01); *G05B 2219/2231* (2013.01)

(58) Field of Classification Search
CPC .......... G05B 2219/2231; G05B 19/056; H04L 12/12
See application file for complete search history.

(56) References Cited

U.S. PATENT DOCUMENTS

| | | | |
|---|---|---|---|
| 2013/0173868 A1 | 7/2013 | Leyrer et al. | |
| 2016/0259000 A1 | 9/2016 | Robbins | |
| 2017/0300432 A1* | 10/2017 | Kitamura | G06F 13/4068 |
| 2018/0011466 A1* | 1/2018 | Murayama | G05B 19/05 |
| 2018/0356786 A1* | 12/2018 | Ozaki | G05B 19/05 |

FOREIGN PATENT DOCUMENTS

| | | |
|---|---|---|
| EP | 3451162 | 3/2019 |
| JP | 2005284468 | 10/2005 |
| JP | 2014182642 | 9/2014 |
| JP | 2016197384 | 11/2016 |
| JP | 2017111641 | 6/2017 |
| JP | 2017162413 | 9/2017 |

OTHER PUBLICATIONS

"Office Action of Japan Counterpart Application" with English translation thereof, issued on Mar. 7, 2023, p. 1-p. 5.

"Search Report of Europe Counterpart Application", issued on Nov. 7, 2022, p. 1-p. 7.

"International Search Report (Form PCT/ISA/210) of PCT/JP2020/005620," mailed on Apr. 14, 2020, with English translation thereof, pp. 1-4.

"Written Opinion of the International Searching Authority (Form PCT/ISA/237) of PCT/JP2020/005620," mailed on Apr. 14, 2020, with English translation thereof, pp. 1-8.

Office Action of China Counterpart Application, with English translation thereof, issued on Nov. 25, 2023, pp. 1-18.

* cited by examiner

| Vendor ID | 65537 |
| --- | --- |
| Device ID | 612 |
| IO-Link revision | 1 |
| Input data length | 4 bytes |
| Output data length | 4 bytes |

FIG. 5

SETTINGS INFORMATION GENERATION DEVICE, SETTINGS INFORMATION GENERATION METHOD, AND RECORDING MEDIUM

CROSS-REFERENCE TO RELATED APPLICATION

This application is a 371 application of the International PCT application serial no. PCT/JP2020/005620, filed on Feb. 13, 2020, which claims the priority benefits of Japan Patent Application No. 2019-047220, filed on Mar. 14, 2019. The entirety of each of the above-mentioned patent applications is hereby incorporated by reference herein and made a part of this specification.

BACKGROUND

Technical Field

The invention relates to a settings information generation device that generates settings information of a superordinate device that communicates with a slave device having a communication port to which the device is connected.

Description of Related Art

Conventionally, a system including a device and a slave device having a communication port to which the device is connected is known. Patent Literature 1 discloses a slave device that acquires the identification information of the device from the device connected to a communication port in the system and generates, on the basis of the acquired identification information, the configuration settings information including information of the device to be connected to the communication port.

RELATED ART

Patent Literature

[Patent Literature 1] Japanese Patent No. 2017-162413 (published on Sep. 14, 2017)

SUMMARY

Problems to be Solved

The system as described above has a superordinate device that controls the entire system, and a slave device is connected to the superordinate device. Settings according to the connected device are required not only for the slave device but also for the superordinate device that communicates with the slave device. Specifically, the superordinate device needs to be set according to the device regarding the storage region of data exchanged with the device via the slave device. However, even with the above-mentioned conventional technology, the settings in the superordinate device needs to be made manually, and such work takes time.

One aspect of the invention is to reduce the steps for setting the device in the superordinate device that communicates with the slave device having the communication port to which the device is connected.

Means for Solving the Problems

In order to solve the above problems, the invention provides a settings information generation device, generating settings information of a superordinate device that communicates with a slave device including a communication port to which the device is connected, the settings information generation device including a selection unit for accepting a selection of the device to be connected from a user; an acquisition unit for acquiring operational settings information including an input/output data length of the selected device; and a generation unit for generating, on the basis of the operational settings information, superordinate device settings information that sets a storage region in the superordinate device in which the superordinate device stores data exchanged with the device via the slave device.

In order to solve the above problems, the invention provides a settings information generation method generating, settings information of a superordinate device that communicates with a slave device including a communication port to which the device is connected, the settings information generation method including: a selection step, accepting a selection of the device to be connected from a user; an acquisition step, acquiring an operational settings information including an input/output data length of the selected device; and a generation step, generating, on the basis of the operational settings information, superordinate device settings information that sets a storage region in the superordinate device in which the superordinate device stores data exchanged with the device via the slave device.

Effects

According to one aspect of the invention, it is possible to reduce the steps for setting the device in the superordinate device that communicates with the slave device having the communication port to which the device is connected.

BRIEF DESCRIPTION OF THE DRAWINGS

FIG. 5 is a diagram showing an example of operational settings information acquired by a settings information generation device according to an embodiment of the invention.

DESCRIPTION OF THE EMBODIMENTS

Hereinafter, each embodiment (hereinafter, also referred to as "the present embodiment") according to one aspect of the invention will be described with reference to the drawings.

Embodiments

§ 1 Application Example

Figure 1:
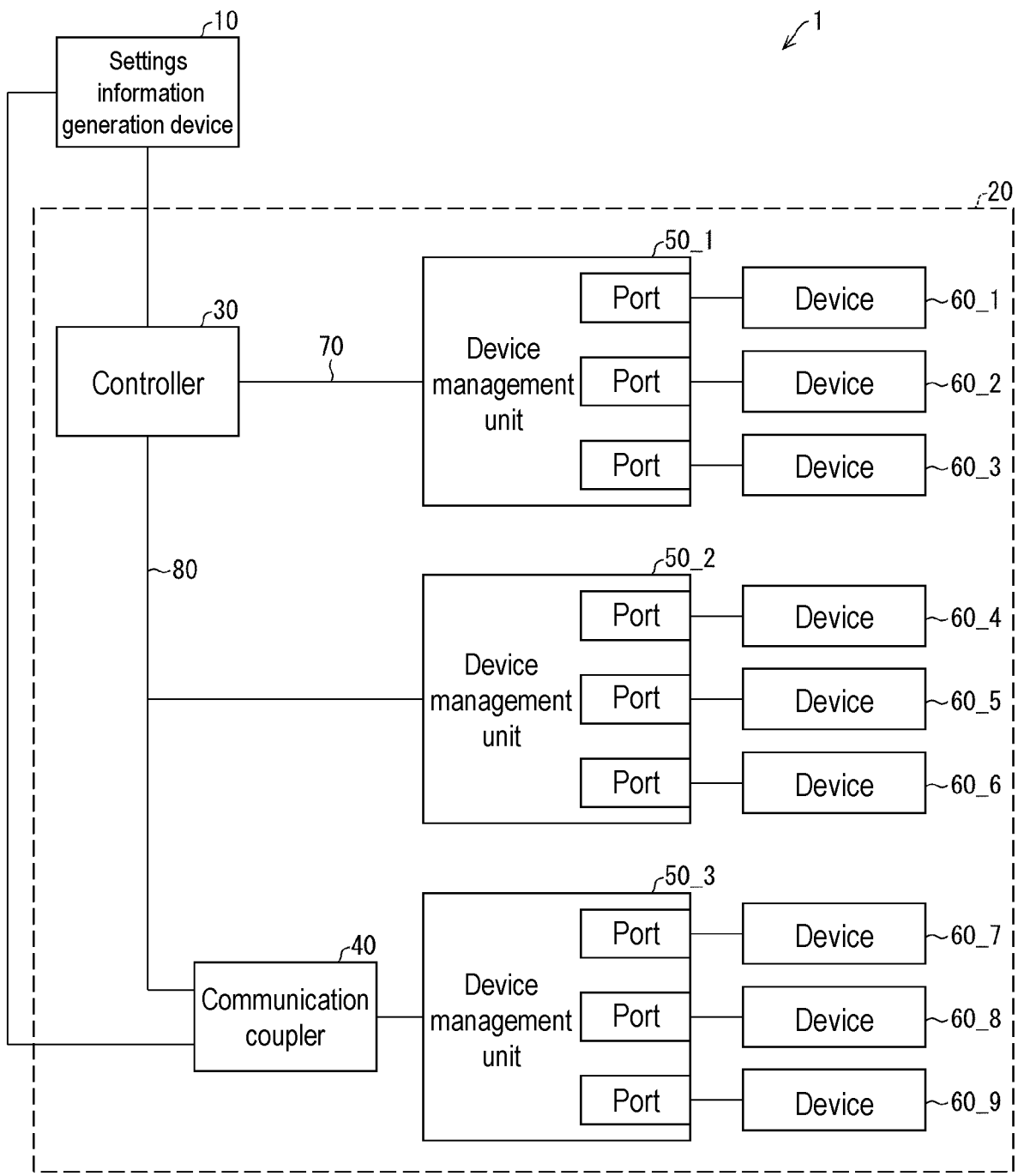
FIG. 1 is a diagram showing an overall outline of an information processing system according to an embodiment of the invention.

FIG. 1 is a block diagram showing a configuration of an information processing system 1 as an example of a system to which a settings information generation device 10 according to the present embodiment is applied. In FIG. 1, an information processing system 1 includes the settings information generation device 10 and a control system 20. The settings information generation device 10 is communicably connected to a controller 30 and a communication coupler 40, which will be described later, included in the control system 20.

(Outline of Configuration of the Control System 20)

The control system 20 includes the controller 30, the communication coupler 40, device management units 50_1 to 50_3, and devices 60_1 to 60_3, 60_4 to 60_6, and 60_7 to 60_9. The controller 30 and the communication coupler 40 correspond to an example of the superordinate device in the invention. The device management units 50_1 to 50_3 correspond to an example of the slave device in the invention.

The device management units 50_1 to 50_3 are connected to the controller 30. Each of the one or more communication ports of the device management units 50_1 to 50_3 is connected to one of the devices 60_1 to 60_9. The device management units 50_1 to 50_3 manage the input/output of data to and from the devices 60_1 to 60_9. The controller 30 communicates with each device management unit 50 to control the entire control system 20. Hereinafter, when it is not necessary to distinguish between the device management units 50_1 to 50_3, each of them is also simply referred to as the device management unit 50. When it is not necessary to distinguish between the devices 60_1 to 60_1, each is also simply referred to as device 60. The number of each device included in the control system 20, the network configuration for connecting each device, and the number of communication ports of the device management unit 50 are not limited to the illustrated examples.

For example, the control system 20 may be an IO-Link (registered trademark) system. In this case, the device 60 is an IO-Link device corresponding to the IO-Link interface, for example, a sensor, an actuator, or the like. Moreover, the device management unit 50 is an IO-Link master that performs point-to-point communication with the IO-Link device. Communication is performed with IO-Link between the device management unit 50 and the device 60. Further, the controller 30 is realized by a PLC (Programmable Logic Controller). Details of IO-Link will be described later.

(Connection Form of the Device Management Unit 50)

The connection form of the device management unit 50 in the control system 20 is various. For example, the device management unit 50_1 is connected to the controller 30 via a bus 70. The data output from the devices 60_1 to 60_3 is input to the device management unit 50_1 and transmitted from the device management unit 50_1 to the controller 30 via the bus 70. The data for the controller 30 to control the devices 60_1 to 60_3 is transmitted from the controller 30 to the device management unit 50_1 via the bus 70, and is input from the device management unit 50_1 to the devices 60_1 to 60_3. The superordinate device of the device management unit 50_1 is the controller 30.

Further, the device management unit 50_2 s connected to the controller 30 via a field network 80. The data output from the devices 60_4 to 60_6 is input to the device management unit 50_2, and is transmitted from the device management unit 50_2 to the controller 30 via the field network 80. The data for the controller 30 to control the devices 60_4 to 60_6 is transmitted from the controller 30 to the device management unit 50_2 via the field network 80, and is input from the device management unit 50_2 to the devices 60_4 to 60_6. The superordinate device of the device management unit 50_2 is the controller 30.

Further, the device management unit 50_3 is connected to the controller 30 via the communication coupler 40 connected to the field network 80. The data output from the devices 60_7 to 60_9 is input to the device management unit 50_3, transmitted from the device management unit 50_3 to the communication coupler 40, and transmitted from the communication coupler 40 to the controller 30 via the field network 80. The data for the controller 30 to control the devices 60_7 to 60_9 is transmitted from the controller 30 to the communication coupler 40, transmitted from the communication coupler 40 to the device management unit 50_3, and input from the device management unit 50_3 to the devices 60_6 to 60_9. The superordinate device of the device management unit 50_3 is the communication coupler 40.

(Settings Information Required for Superordinate Device)

In the controller 30 and the communication coupler 40 as superordinate devices, it is necessary to set the storage region of data input from/output to the device 60 via the device management unit 50. For example, in the controller 30 and the communication coupler 40, it is necessary to allocate the IO memory according to the input/output data length of the device 60 connected to subordinate. The IO memory is a storage unit of a transfer destination to which the device management unit 50 transfers data input from the device 60. The IO memory has a storage region. In the controller 30 and the communication coupler 40, it is necessary to allocate a storage region for each device 60 connected to the subordinate such that a capacity corresponding to the input/output data length is secured.

(Settings Information Required for the Slave Device)

In the device management unit 50 as a slave device, it is necessary to set the storage region of data input from/output to the connected device 60. For example, in the device management unit 50, it is necessary to set the input/output data length of the device 60 connected to each communication port. Further, in the device management unit 50, it is necessary to set the identification information of the device 60 connected to each communication port in order to execute the collation process described later.

(Overview of the Function of the Settings Information Generation Device 10)

The settings information generation device 10 generates, on the basis of the operational settings information 121 corresponding to the device 60, superordinate device settings information. The superordinate device settings information includes information on a storage region of data exchanged with the device 60 via the device management unit 50 in each of the controller 30 and the communication coupler 40. Further, the settings information generation device 10 transmits the superordinate device settings information to the controller 30 and the communication coupler 40, and causes each device to automatically execute the settings process.

Further, the settings information generation device 10 generates, on the basis of the operational settings information 121 corresponding to the device 60, slave device settings information. The slave device settings information includes information on a storage region of data input from/output to the device 60 in the device management unit 50. Further, the settings information generation device 10 transmits the generated slave device settings information to the device management unit 50, and causes the device to automatically execute the settings process.

(Effect of the Settings Information Generation Device 10)

In the control system 20, the controller 30, the communication coupler 40, and the device management unit 50 need to be set according to each device 60 as many as the number of the devices 60 to be included in the control system 20. Manually performing such settings is a complicated task for the user and requires a lot of settings steps. The manual operation means that the user refers to the manual of the device and inputs information on the storage region for each device by using, for example, a tool for manually setting. The settings information generation device 10 generates the superordinate device settings information and the slave device settings information by using the operational settings information 121 corresponding to each device 60, thereby eliminating the need for such manual settings work and significantly reducing the settings steps.

§ 2 Configuration Example

Figure 2:
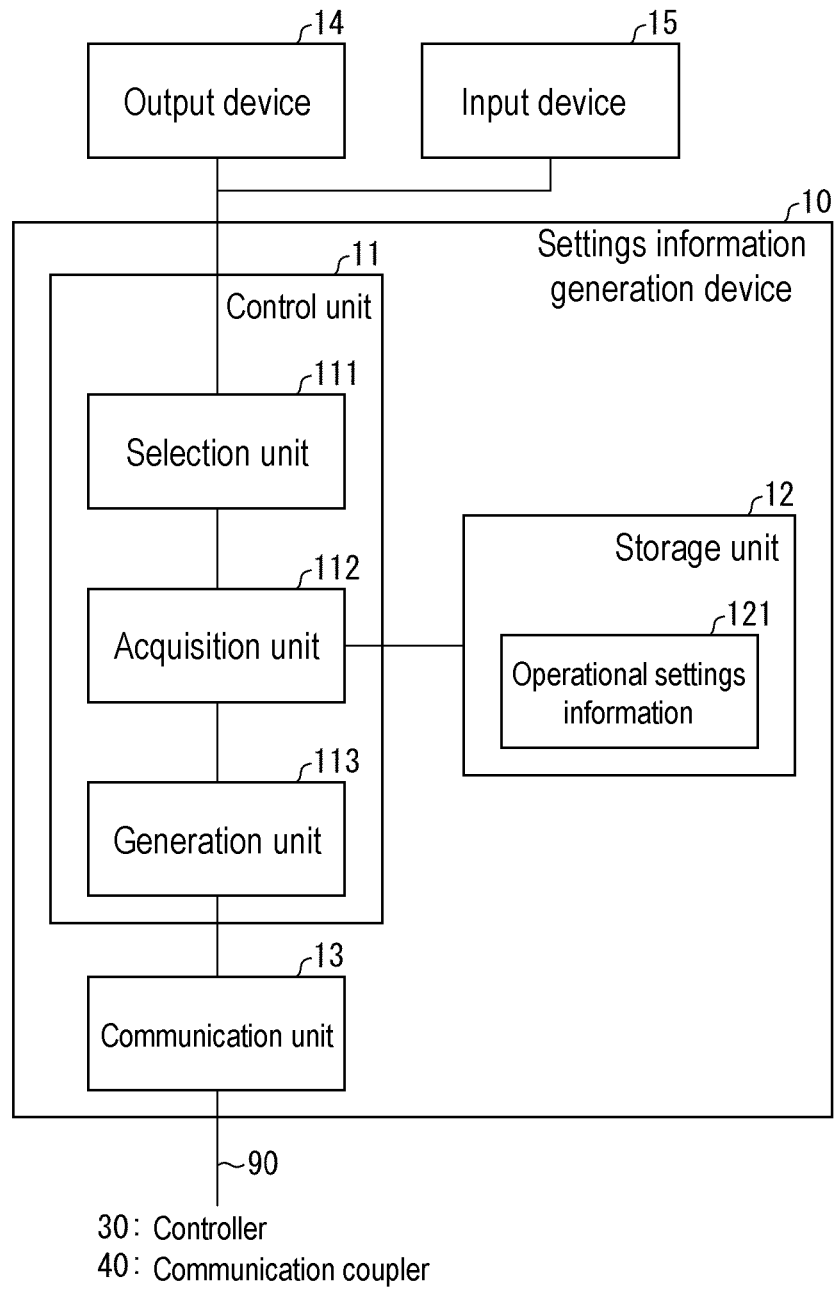
FIG. 2 is a block diagram showing a configuration of a settings information generation device according to an embodiment of the invention.

FIG. 2 is a block diagram showing an example of a detailed configuration of the settings information generation device 10. In FIG. 2, the settings information generation device 10 includes a control unit 11, a storage unit 12, and a communication unit 13. The settings information generation device 10 may be realized by a computer including a memory and a processor. Further, an output device 14 and an input device 15 are connected to the settings information generation device 10. As the output device 14, for example, a display, a printer, a speaker, or a combination thereof is used. As the input device 15, for example, a keyboard, a mouse, a touch pad, a microphone, or a combination thereof or the like is used. Further, the settings information generation device 10 is connected to the controller 30 and the communication coupler 40 via a network 90. The network 90 may be the field network 80 or a network different from the field network 80.

The control unit 11 controls the operation of the settings information generation device 10 in an integrated manner. The control unit 11 is composed of a processor included in the computer. The control unit 11 functions as a selection unit 111, an acquisition unit 112, and a generation unit 113 by reading a control program described later from the storage unit 12 and executing the control program. Details of the selection unit 111, the acquisition unit 112, and the generation unit 113 will be described later.

The storage unit 12 is composed of a memory owned by a computer. The storage unit 12 stores multiple operational settings information 121. Each of the multiple operational settings information 121 corresponds to any one of the multiple candidates of the device 60 that may be connected. Further, the storage unit 12 stores a control program for causing the settings information generation device 10 to function as the selection unit 111, the acquisition unit 112, and the generation unit 113.

The communication unit 13 is a communication module connected to the network 90.

The selection unit 111 accepts the selection of the device 60 to be connected from the user. Specifically, the selection unit 111 presents multiple candidates of the connected device 60 to the user by outputting them to the output device 14. For example, the multiple candidates may be displayed on a display as an example of the output device 14. The selection unit 111 accepts the selection of the device 60 to be connected from the multiple presented candidates via the input device 15. For example, when the selection unit 111 accepts an operation in the output device 14 of pointing to a region in which any of a multiple candidates is displayed by the mouse as an example of the input device 15, the selection unit 111 selects the device 60 indicated by the candidate displayed in the region.

The acquisition unit 112 acquires the operational settings information 121 corresponding to the device 60 selected by the selection unit 111 from the storage unit 12. The operational settings information 121 includes the input data length to the device 60 and the output data length from the device 60. Further, the operational settings information 121 includes the identification information of the device 60.

The generation unit 113 generates, on the basis of the operational settings information 121 corresponding to the device 60, superordinate device settings information. Further, the generation unit 113 generates, on the basis of the operational settings information 121 corresponding to the device 60, slave device settings information. Specifically, the superordinate device settings information is information for executing the IO memory allocation process based on the input data length and the output data length of the device 60. For example, the superordinate device settings information includes information on the input data length and the output data length to be allocated in the IO memory of the superordinate device. Further, the slave device settings information is information for setting the input data length and the output data length for the device 60. For example, the slave device settings information includes information on the input data length and the output data length to be allocated in the memory of the device management unit 50. Further, the slave device settings information further includes the identification information of the device 60. The identification information included in the slave device settings information is used in the collation process described later, which is executed in the device management unit 50.

Further, the generation unit 113 causes each device to execute the settings process by transmitting the generated superordinate device settings information to the controller 30 and the communication coupler 40, which are the superordinate devices of the unit management 50 to which the device 60 is connected, via the communication unit 13. Further, the generation unit 113 causes the device to execute the process by transmitting the generated slave device settings information to the device management unit 50 to which the device 60 is connected via the communication unit 13. Further, the slave device settings information is transmitted to the corresponding device management unit 50 via any of the controller 30 and the communication coupler 40.

§ 3 Operation Example

Figure 3:
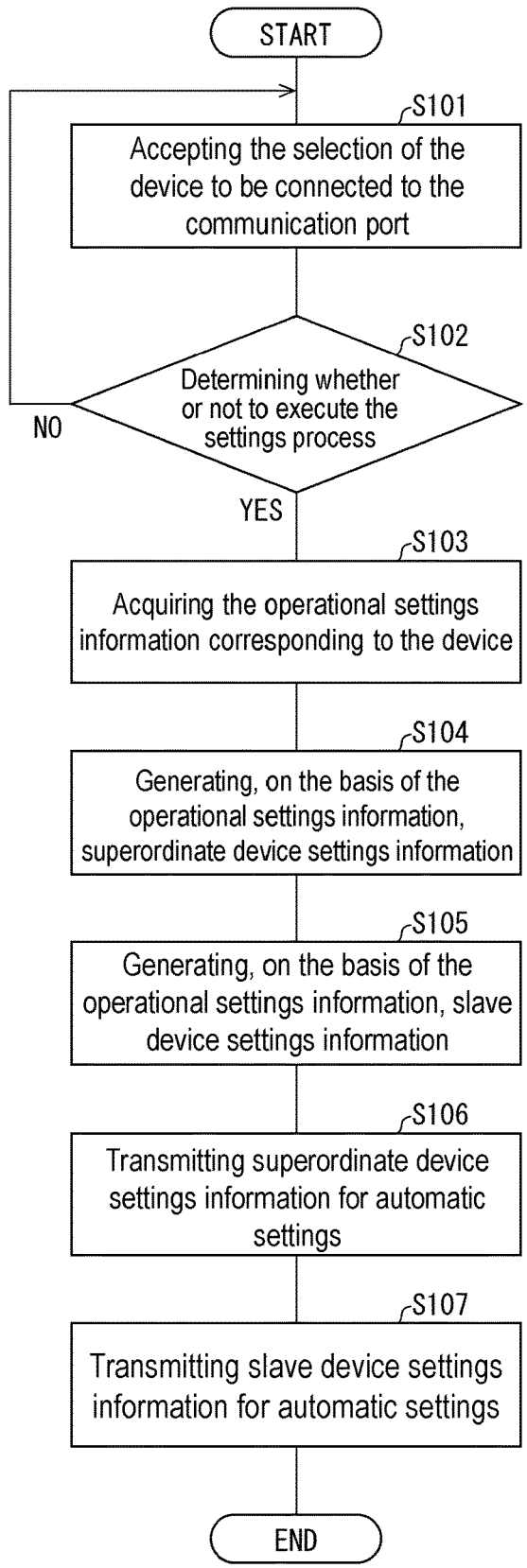
FIG. 3 is a flowchart showing an example of an operation of a settings information generation device according to an embodiment of the invention.

FIG. 3 is a flowchart showing an example of an operation of a settings information generation device 10 according to the present embodiment. When the operation of FIG. 3 is executed, the settings information generation device 10 stores information representing the network configuration related to the controller 30, the communication coupler 40, and the device management unit 50 included in the control system 20. And, when the operation of FIG. 3 is executed, the control system 20 may be in a state in which some or all of the devices 60 to be connected are not connected.

In step S101, the selection unit 111 accepts an operation of selecting, from multiple candidates, the device 60 to be connected to the communication port of the device management unit 50 included in the control system 20. The selection unit 111 selects the device 60 indicated by the selected operation. The step is executed for an unselected communication port in which the device 60 to be connected is not yet selected among the communication ports of each device management unit 50. Moreover, the step may be executed on the selected communication port that the device 60 to be connected to has already selected. In this case, the device 60 is newly selected in place of the selected device 60 for the communication port.

In step S102, the control unit 11 determines whether or not to execute the settings process. For example, the control unit 11 may determine whether or not to execute the settings process according to the input operation of the user.

In the case of No in step S102, the settings information generation device 10 repeats the process of step S101. In the case of Yes in step S102, the process of the next step S103 is executed.

In step S103, the acquisition unit 112 acquires the operational settings information 121 corresponding to each selected device 60 from the storage unit 12.

In step S104, the generation unit 113 generates, on the basis of each acquired operational settings information, superordinate device settings information.

In step S105, the generation unit 113 generates, on the basis of the acquired operational settings information, slave device settings information.

In step S106, the generation unit 113 transmits the generated superordinate device settings information to the controller 30 and the communication coupler 40, and automatically executes the settings process. As the device to which the superordinate device settings information is transmitted, the superordinate device of the device management unit 50 to which the device 60 indicated by the superordinate device settings information is connected is determined based on the network configuration of the control system 20.

In step S107, the generation unit 113 transmits the generated slave device settings information to the corresponding device management unit 50, and automatically executes the settings process. As the device to which the slave device settings information is transmitted, the device management unit 50 to which the device 60 indicated by the slave device settings information is connected is determined.

The processes of steps S106 to S107 may be executed in response to the user's operation. For example, the processes of steps S106 to S107 are executed in response to the operation of instructing the batch automatic settings of the superordinate device settings information and the slave device settings information. Further, the process of step S106 may be executed in response to the operation of instructing the automatic settings of the superordinate device settings information, and the process of step S107 may be executed in response to the operation of instructing the automatic settings of the slave device settings information.

With the above, the settings information generation device 10 terminates the operation.

(Example of Selection Screen)

Figure 4:
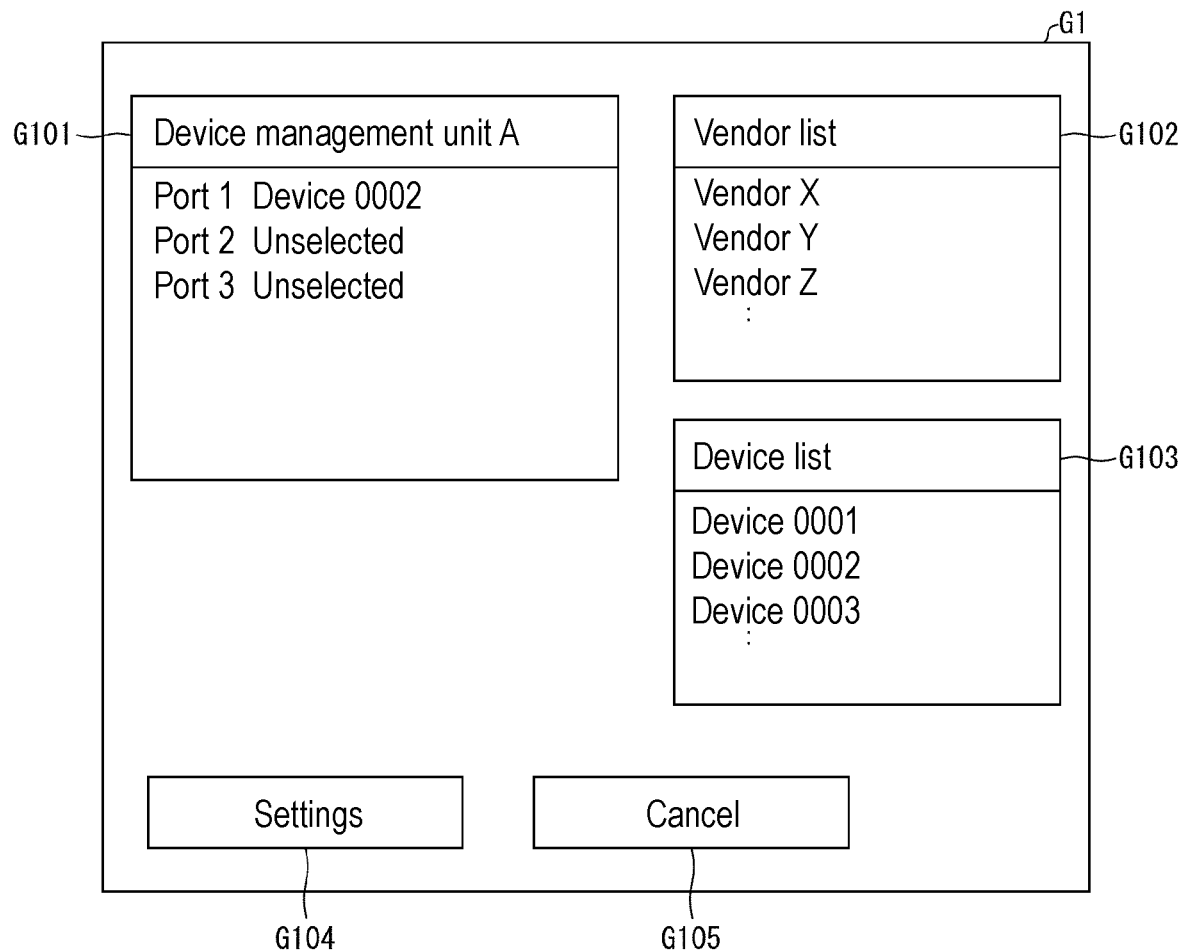
FIG. 4 is a diagram showing an example of a selection screen displayed by a settings information generation device according to an embodiment of the invention.

FIG. 4 is a diagram showing an example of a selection screen G1 displayed in step S101.

A region G101 is a region for displaying a list of communication ports of the target device management unit 50 among the device management units 50 included in the control system 20. Here, communication ports 1 to 3 of the device management unit 50 are displayed for the device management unit 50 of the identification information "A" (hereinafter also referred to as device management unit A). For example, in response to an input operation for a selection button (not shown) for selecting any of the device management units 50 included in the control system 20, a list of communication ports of the corresponding device management unit 50 may be displayed in the region G101.

In the example of FIG. 4, the device 60 with identification information "0002" (hereinafter, also referred to as device 0002) is selected for the communication port 1. The communication ports 2 and 3 are unselected.

A region G102 is a region for displaying a list of vendors of the device 60 that may be included in the control system 20. Each vendor indicated in the region G102 may be selected by an input operation.

A region G103 is a region for displaying a list of the devices 60 provided by the relevant vendor. In the region G103, a list of the corresponding devices 60 is displayed according to the vendor selection operation in the region G102. Each device 60 indicated in the region G103 may be selected in association with any of the communication ports indicated in the region G101 by an input operation. For example, the drag operation may be performed by the mouse from the region indicating any of the devices 60 in the region G103 to the region indicating any of the communication ports in the region G101. In this case, the selection unit 111 selects the corresponding device 60 for the corresponding communication port by the drag operation. Further, when the corresponding communication port is not selected in the region G101 (the port 2 or 3 in the example of FIG. 4), the selection unit 111 displays the identification information of the selected device 60 in place of the information of "unselected". Further, when the corresponding communication port has been selected (the port 1 in the example of FIG. 4), the selection unit 111 displays the identification information of the selected device 60 in place of the identification information of the selected device 60.

A settings button G104 accepts an input operation for performing the determination process in step S102 shown in FIG. 3. When the input operation for the settings button G104 is accepted, it is determined to be Yes in step S102, and steps S103 to S107 are executed. That is, the operational settings information 121 is acquired for the selected device 60 (the device 0002 in this example) shown in the region G103, and the superordinate device settings information and the slave device settings information are generated. Then, in the controller 30 or the communication coupler 40, the IO allocation process based on the input/output data length of the device 0002 is executed on the basis of the superordinate device settings information. Further, in the device management unit A, the settings process of the input/output data length and the identification information of the device 0002 is executed on the basis of the slave device settings information.

The display of the selection screen G1 may be used to terminate when the input operation for a cancel button G105 is accepted.

(Example of Operational Settings Information)

FIG. 5 is a diagram showing an example of the operational settings information 121 acquired from the storage unit 12 in step S103. Here, the case where the control system 20 is an IO-Link system will be described. In this case, the operational settings information 121 corresponding to the device 60 is provided by the vendor as an IODD (IO Device Description) file. FIG. 5 is a diagram showing an example of information contained in the IODD file. In the present embodiment, the IODD file corresponding to each device 60 is acquired in advance and stored in the storage unit 12.

In the IODD file, the vendor ID indicates the vendor identification information of the device 60. The device ID indicates the identification information of the device 60. An IO-Link revision indicates revision of IO-Link that the device 60 corresponds to. The combination of vendor ID, device ID and IO-Link revision corresponds to an example of device identification information in the invention. The input data length indicates the data length that the device management unit 50 accepts as input from the device 60. The output data length indicates the data length output by the device management unit 50 to the device 60.

The superordinate device settings information is generated on the basis of this IODD file. For example, it is assumed that the corresponding device management unit A is connected to the controller 30 via the communication coupler 40 as the device management unit 50_3 shown in FIG. 1. In this case, in the communication coupler 40, a 4-byte IO memory allocation process is performed, on the basis of the superordinate device settings information, so as to store the input data from the device 0002. Further, a 4-byte IO memory allocation process is performed so as to store the output data to the device 0002.

Further, slave device settings information is generated on the basis of this IODD file. Then, in the device management unit 50 to which the device 60 indicated by the slave device settings information is connected, on the basis of the slave device settings information, 4 bytes are set as the input data length of the device 60 (the storage region of the memory is allocated). Moreover, 4 bytes are set as the output data length of the device 60. Further, as the identification information of the device 60, vendor ID "65537", device ID "612", and IO-Link revision "1" are set.

(Collation Process Using Slave Device Settings Information)

Here, the slave device settings information is used to collate whether the device 60 actually connected to the device management unit 50 matches the device 60 selected by the settings information generation device 10.

Specifically, the device management unit 50 compares the identification information acquired from the actually connected device 60 with the identification information of the device 60 indicated by the slave device settings information, and determines whether or not they match. If they match, the device management unit 50 determines that the actually connected device 60 is the correct (planned) device 60, and if they do not match, it determines that it is not correct.

In this way, the settings information generation device 10 may not only automatically execute the settings process according to the device 60 in the device management unit 50, but also determine whether or not the actually connected device 60 is correct. For example, when the control system 20 is an IO-Link system, the slave device settings information is used in the collation function of the IO-Link master as the device management unit 50. Details of the IO-Link will be described below.

(About IO-Link)

IO-Link is standardized in IEC61131-9 under the name of "Single-drop digital communication interface for small sensors and actuators" (SDCI), and is a standardized technology for communication between a master (PLC) (for example, the controller 30 in the control system 20) which is a control device and a device such as a sensor and an actuator (e.g. the device 60 in the control system 20). IO-Link is a new point-to-point serial communication protocol used to communicate between a master (PLC) and a device such as a sensor and an actuator.

The IO-Link is a communication protocol (for example, a second mode communication protocol in the control system 20) capable of exchanging 32-byte (256 bits) of data (two-way communication), unlike the conventional protocol (for example, the communication protocol of a first mode in the control system 20) that may only transmit on/off signals (1 bit) from the device to the master (PLC). By connecting the master (PLC) and the device such as sensor and actuator with IO-Link, a signal from the device that could only receive binarized data such as on/off information in the past may now be acquired as 32-byte numerical data. So, for example, in the case of a photoelectric sensor, it is possible to acquire information such as the amount of light received, the detection margin, and the internal temperature, in addition to being useful for investigating the cause of defects, it is also possible to diagnose product life and change the threshold value according to aging deterioration.

By using IO-Link, for example, device settings and maintenance may be automated. Further, by using IO-Link, programming of the master (PLC) can be greatly simplified, and further, the cost of the wiring cable can be reduced. Examples of devices include photoelectric sensors and proximity switches.

(IO-Link System)

The IO-Link system includes an IO-Link device (generally a sensor, actuator, or a combination thereof), a standard 3-wire sensor/actuator cable, and an IO-Link master (such as the device management unit 50 in the control system 20).

Here, the IO-Link master has one or multiple ports, and one IO-Link device may be connected to each port. The IO-Link master performs point-to-point communication with the IO-Link device. The IO-Link master may exchange not only conventional binarized data (1-bit data) such as on/off information but also information other than binarized data (data larger than 1 bit) such as on/off information such as device identification information, device communication properties, device parameters, and process/diagnostic data information, and the like with the IO-Link device.

The IO-Link device refers to a device capable of exchanging data larger than 1 bit with the IO-Link master (for example, the device 60 (C) in the control system 20).

(Two Communication Modes)

The IO-Link device may operate without an IO-Link master in a conventional digital exchange mode called Standard I0 (SIO) (e.g. the first mode in control system 20); that is, it may be operated by using a master that may receive only binarized data such as on/off information from the sensor. Similarly, the IO-Link master is a device that may receive only binarized data such as on/off information from the IO-Link master using SIO; for example, the device 60 in the control system 20 may be operated.

The IO-Link master port holds the configuration data. When a port is set to SIO mode, the IO-Link master operates the port in the same way as a conventional port (a port that may exchange only binarized data such as on/off information). If a port is set to communication mode (COM mode) (e.g. the second mode in the control system 20), the IO-Link master is a device connected to that port (IO-Link device, e.g. the device in the control system 20). For example, data larger than 1 bit may be exchanged with the device 60 (C)) in the control system 20.

(About Collation Function)

By using IO-Link, information other than on/off data (data larger than 1 bit) may be acquired from the device such as sensor and actuator (IO-Link devices). Specifically, device identification information (the vendor ID, the device ID, the revision, and a serial number) and the like may be acquired.

The IO-Link master has a collation function for collating the device to be connected with the device actually connected to the port for each port. The IO-Link master executes the collation process at the timing when the IO-Link communication is established. For example, when an IO-Link device is connected to a port, the IO-Link master acquires device identification information and device communication properties from the connected IO-Link device.

Further, the IO-Link master stores in advance configuration settings information including identification information of a device (IO-Link device) to be connected for each port.

The IO-Link master refers to the configuration settings information to acquire the identification information of the device (IO-Link device) to be connected to the port, and determines whether or not it matches the identification of the device actually connected to the port (IO-Link device).

For example, the IO-Link master determines, for each port, whether the "vendor ID, device ID, IO-Link revision, serial number" of the device to be connected and the "vendor ID, device ID, IO-Link revision, serial number" of the actually connected match. If the IO-Link master determines that they do not match (collation error), the IO-Link master stops the IO-Link communication.

Moreover, one of the following two patterns may be selected for the identification information used by the IO-Link master in the collation process. First, the IO-Link master may be made to perform collation process using the vendor ID, the device ID, and the IO-Link revision (simple collation function). Second, the IO-Link master may be made to perform collation process using the vendor ID, the device ID, the IO-Link revision, and the serial number (detailed collation function). Here, if the serial number is not referred to during the collation process, as long as the device (the device having the same vendor ID, device ID, and IO-Link revision with the registered device, excluding the serial number) has the same format as the registered device, the IO-link master determines that the collation is normal and may perform IO-Link communication with the exchanged device even if the serial numbers do not match.

§ 4 Modification Example

In the present embodiment, it is described that multiple operational settings information 121 corresponding to each of the multiple candidate devices 60 is stored in advance in the storage unit 12. Not limited thereto, the operational settings information 121 may be acquired from an external server as needed. In this case, for example, the storage unit 12 may store access information to an external server that provides downloadable operational settings information 121 for each vendor of the device 60 that may be multiple candidates. For example, the acquisition unit 112 may access the above-mentioned external server provided by the vendor of the device 60 selected by the selection unit 111 based on the access information, and download the operational settings information 121 of the device 60.

Further, in the present embodiment, it is described that the superordinate device settings information and the slave device settings information are transmitted from the settings information generation device 10 to the controller 30, the communication coupler 40, and the device management unit 50 via the network 90. Not limited thereto, the superordinate device settings information and the slave device settings information may be stored in a portable storage medium in the settings information generation device 10. In this case, by reading the portable storage medium into the controller 30, the communication coupler 40, and the device management unit 50, the settings process may be automatically performed in each device.

Further, in the present embodiment, the superordinate device settings information and the slave device settings information are described as including both the input data length and the output data length of the device 60, but having either one will do.

[Summary]

A settings information generation device according to an aspect of the invention generates settings information of a superordinate device that communicates with a slave device including a communication port to which the device is connected, the settings information generation device including a selection unit for accepting a selection of the device to be connected from a user; an acquisition unit for acquiring operational settings information including an input/output data length of the selected device; and a generation unit for generating, on the basis of the operational settings information, superordinate device settings information that sets a storage region in the superordinate device in which the superordinate device stores data exchanged with the device via the slave device.

According to the above configuration, since the user may use the superordinate device settings information in the settings work for setting the storage region in the superordinate device, it is not necessary to manually input the data length information of the input from the device or the output to the device. As a result, there is an effect that the settings information generation device can reduce the settings steps related to the device in the superordinate device that communicates with the slave device having the communication port to which the device is connected.

In the settings information generation device according to an aspect of the invention, the generation unit generates, on the basis of the operational settings information, slave device settings information that sets a storage region in the slave device in which the slave device stores data exchanged with the device.

According to the above configuration, since the user may use the slave device settings information in the settings work for setting the storage region in the slave device, it is not necessary to manually input information such as the input data length from the device or the output data length to the device. As a result, there is an effect that the settings information generation device can further reduce the settings steps related to the device in the slave device having the communication port to which the device is connected.

In the settings information generation device according to an aspect of the invention, the selection unit presents multiple candidates of the device to a user, and accepts a selection of the device to be connected from the multiple candidates; the acquisition unit acquires the operational settings information including identification information of the selected device; and the generation unit generates slave device settings information set for the slave device; the slave device settings information includes the identification information of the selected device used to collate whether the device actually connected to the slave device matches the selected device.

According to the above configuration, there is an effect that not only is it possible to further reduce the steps for setting the device in the slave device having the communication port to which the device is connected, but it is also possible to have the slave device collate whether or not the device connected to the slave device is the one to be connected.

The settings information generation device according to an aspect of the invention includes a storage unit storing multiple operational settings information in advance for the multiple candidates of the device, in which the acquisition unit acquires the operational settings information for the selected device from the storage unit.

According to the above configuration, there is an effect that the settings steps for the device that may be multiple candidates can be quickly reduced.

In the settings information generation device according to an aspect of the invention, the acquisition unit acquires the operational settings information for the selected device from an external server.

According to the above configuration, there is an effect that the device that may be multiple candidates may be set based on the latest operational settings information.

In the settings information generation device according to an aspect of the invention, the device is an IO-Link (registered trademark) device, in which the slave device is an IO-Link master.

According to the above configuration, there is an effect that by using the settings information generation device, it is possible to reduce the settings steps in the superordinate device of the slave device capable of communicating with the device by IO-Link.

In the settings information generation device according to an aspect of the invention, the superordinate device is a PLC.

According to the above configuration, there is an effect that by using the settings information generation device, it is possible to reduce the settings steps in the superordinate device suitable for automatically controlling the device.

In the settings information generation device according to an aspect of the invention, the superordinate device is a communication coupler that communicates with a PLC via a network.

According to the above configuration, there is an effect that by using the settings information generation device, it is possible to reduce the settings steps when the slave device to which the device is connected is connected to the superordinate device via the communication coupler.

A settings information generation method generates settings information of a superordinate device that communicates with a slave device including a communication port to which the device is connected, the settings information generation method including: a selection step, accepting a selection of the device to be connected from a user; an acquisition step, acquiring an operational settings information including an input/output data length of the selected device; and a generation step, generating, on the basis of the operational settings information, superordinate device settings information that sets a storage region in the superordinate device in which the superordinate device stores data exchanged with the device via the slave device.

According to the above configuration, since the user may use the superordinate device settings information in the settings work for setting the storage region in the superordinate device, it is not necessary to manually input information such as the input data length from the device or the output data length to the device. As a result, the settings information generation device has an effect of reducing the settings steps related to the device in the superordinate device that communicates with the slave device having the communication port to which the device is connected.

[Example Realized by Software]

A control block (particularly, the selection unit 111, the acquisition unit 112, and the generation unit 113) of the settings information generation device 10 may be realized by a logic circuit (hardware) formed in an integrated circuit (IC chip) or the like, or may be realized by software.

In the latter case, the settings information generation device 10 includes a computer that executes instructions of a program that is software that realizes each function. The computer includes, for example, one or more processors and a computer-readable recording medium that stores the program. Then, in the computer, the processor reads and executes the program from the recording medium, thereby achieving the object of the invention. As the processor, for example, a CPU (Central Processing Unit) may be used. As the recording medium, a "non-transitory tangible medium", for example, a ROM (Read Only Memory) or the like, a tape, a disk, a card, a semiconductor memory, a programmable logic circuit, or the like may be used. Further, a RAM (Random Access Memory) for expanding the above program may be further provided. Further, the program may be supplied to the computer via an arbitrary transmission medium (communication network, broadcast wave, etc.) capable of transmitting the program. Moreover, one aspect of the invention may also be realized in the form of a data signal embedded in a carrier wave, in which the above program is embodied by electronic transmission.

The invention is not limited to the above-described embodiments. Various modifications can be made within the scope of the claims, and embodiments acquired by appropriately combining the technical means disclosed in the different embodiments are also included in the technical scope of the invention.

DESCRIPTIONS OF REFERENCE NUMERALS

1 Information processing system
10 Settings information generation device
11 Control unit
111 selection unit
112 Acquisition unit
113 Generation unit
12 Storage unit
13 Communication unit
14 Output device
15 Input device
30 Controller
40 Communication coupler
50 Device management unit
60 Device

What is claimed is:

1. A system, comprising:
a control system, comprising:
  a superordinate device; and
  a slave device, communicated with the superordinate device, comprising an unselected communication port in which a device to be connected to the unselected communication port is not yet selected; and
a settings information generation device, connected to the superordinate device, generating settings information of the superordinate device, the settings information generation device comprising a processor configured to:
  accept a selection of the device to be connected to the unselected communication port of the slave device from a user;
  acquire operational settings information comprising an input/output data length of the selected device; and
  generate, on the basis of the operational settings information of the selected device, superordinate device settings information that is information to execute a memory allocation process to reserve a storage region corresponding to the input/output data length of the selected device in the superordinate device to store data exchanged with the selected device via the unselected communication port of the slave device.

2. The system according to claim 1, wherein the processor generates, on the basis of the operational settings information, slave device settings information that sets a storage region in the slave device in which the slave device stores data exchanged with the device.

3. The system according to claim 1, wherein the processor is further configured to:
   present a plurality of candidates of the device to a user, and accepts a selection of the device to be connected from the plurality of candidates;
   acquire the operational settings information comprising identification information of the selected device; and
   generate slave device settings information set for the slave device; wherein
   the slave device settings information comprises the identification information of the selected device used to collate whether the device actually connected to the slave device matches the selected device.

4. The system according to claim 1, comprising a memory storing a plurality of operational settings information in advance for the plurality of candidates of the device, wherein
   the processor acquires the operational settings information for the selected device from the memory.

5. The system according to claim 1, wherein the processor acquires the operational settings information for the selected device from an external server.

6. The system according to claim 1,
   wherein the device is an IO-Link (registered trademark) device,
   wherein the slave device is an IO-Link master.

7. The system according to claim 1, wherein the superordinate device is a PLC.

8. The system according to claim 1, wherein the superordinate device is a communication coupler that communicates with a PLC via a network.

9. A non-transient computer-readable recording medium, recording a control program for operating a computer as the settings information generation device according to claim 1.

10. A settings information generation method, generating settings information of a superordinate device in a system, the system comprising a control system and a setting information generation device, the control system comprises the superordinate device and a slave device, the slave device comprising an unselected communication port in which a device to be connected to the unselected communication port is not yet selected, the settings information generation method comprising:
    accepting a selection of the device to be connected to the unselected communication port of the slave device from a user;
    acquiring an operational settings information comprising an input/output data length of the selected device; and
    generating, on the basis of the operational settings information of the selected device, superordinate device settings information that is information to execute a memory allocation process to reserve a storage region corresponding to the input/output data length of the selected device in the superordinate device to store data exchanged with the device via the selected device via the unselected communication port of the slave device.

* * * * *